US010002450B2

(12) United States Patent
Takeuchi et al.

(10) Patent No.: US 10,002,450 B2
(45) Date of Patent: Jun. 19, 2018

(54) ANALYZING A DOCUMENT THAT INCLUDES A TEXT-BASED VISUAL REPRESENTATION

(71) Applicant: INTERNATIONAL BUSINESS MACHINES CORPORATION, Armonk, NY (US)

(72) Inventors: Emiko Takeuchi, Tokyo (JP); Daisuke Takuma, Tokyo (JP); Hirobumi Toyoshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/330,550

(22) Filed: Jul. 14, 2014

(65) Prior Publication Data

US 2015/0026553 A1 Jan. 22, 2015

(30) Foreign Application Priority Data

Jul. 17, 2013 (JP) ................................ 2013-148484

(51) Int. Cl.
*G06F 17/00* (2006.01)
*G06T 11/60* (2006.01)
*G06F 17/22* (2006.01)

(52) U.S. Cl.
CPC .......... *G06T 11/60* (2013.01); *G06F 17/2229* (2013.01)

(58) Field of Classification Search
CPC ......... G06F 17/30256; G06F 17/30265; G06F 17/30268; G06F 17/30247;
(Continued)

(56) References Cited

U.S. PATENT DOCUMENTS 7,028,253 B1 * 4/2006 Lieberman ........ G06F 17/30265 345/625
2002/0188602 A1 * 12/2002 Stubler ............. G06F 17/30256
(Continued)

FOREIGN PATENT DOCUMENTS

JP 2002268665 A 9/2002
JP 2002288082 A 4/2004
(Continued)

*Primary Examiner* — Scott Baderman
*Assistant Examiner* — Jason Edwards
(74) *Attorney, Agent, or Firm* — Daniel C. Housley

(57) ABSTRACT

A hardware device analyzes a document that includes a text-based visual representation. A correspondence information hardware storage device holds known representations of graphical images as text-based visual representations. The graphical images depict portraits of physical objects. The text-based visual representations are associated with information that each describe one of the physical objects. An identification hardware device identifies a text-based visual representation within a document. The identification hardware device matches the text-based visual representation within the document to one or more of the text-based visual representations stored in the correspondence information hardware storage device. An editing hardware device retrieves information from the correspondence information hardware storage device that is identified, by the identification hardware device, as describing a text-based visual representation component within the document. The editing hardware device displays the text-based visual representation component within the document and information that describes the text-based visual representation on a display.

17 Claims, 11 Drawing Sheets

(58) Field of Classification Search
CPC ............. G06F 17/30861; G06F 17/241; G06F 17/289; G06F 17/2229; G06T 11/60
USPC ........................................................... 715/211
See application file for complete search history.

(56) References Cited

U.S. PATENT DOCUMENTS

| | | | | |
|---|---|---|---|---|
| 2003/0110450 | A1* | 6/2003 | Sakai | G06F 17/214 715/256 |
| 2005/0160148 | A1* | 7/2005 | Yu | G06Q 10/107 709/206 |
| 2005/0262210 | A1* | 11/2005 | Yu | H04L 51/12 709/206 |
| 2006/0167992 | A1* | 7/2006 | Cheung | G06F 17/241 709/204 |
| 2010/0205123 | A1* | 8/2010 | Sculley | H04L 63/1408 706/12 |
| 2013/0110620 | A1* | 5/2013 | Zhu | G06F 17/30244 705/14.49 |
| 2013/0151257 | A1* | 6/2013 | MacMannis | G06F 17/211 704/270 |
| 2014/0067397 | A1* | 3/2014 | Radebaugh | G10L 13/08 704/260 |
| 2014/0259157 | A1* | 9/2014 | Toma | H04L 63/1408 726/22 |

FOREIGN PATENT DOCUMENTS

| | | | | |
|---|---|---|---|---|
| JP | 2004133918 | A | | 4/2004 |
| JP | 2004287992 | | | 10/2004 |
| JP | 2008269072 | | | 11/2008 |
| JP | 2010097500 | | | 4/2010 |
| JP | 2010102564 | A | | 5/2010 |
| JP | 2011141741 | | | 7/2011 |
| JP | 2011141741 | A | * | 7/2011 |
| JP | 2012084022 | A | | 4/2012 |

* cited by examiner

VISUAL REPRESENTATION
CORRESPONDENCE INFORMATION FILE

181

| No. | OBJECT (PERSON) | VISUAL REPRESENTATION (KNOWN REPRESENTATION) |
|---|---|---|
| 1 | John |  |
| 2 | Daniel |  |
| ⋮ | ⋮ | ⋮ |

182

| No. | PERSONAL NAME |
|---|---|
| 1 | John |
| 2 | Daniel |
| 3 | Sophia |
| ⋮ | ⋮ |

His approval rating will rise even more.

No.0002

＜Second monetary policy！ another hope for us

No.0003
What will they actually do？

No.0004

↑A rare politician who carries out his words.

No.0005

＜http://www.xxx.xxx

＞No.0003

No.0001
<meta type="person" name="John" >

```
        ／ ‾‾‾‾‾‾‾‾‾‾ ＼
       /:::::::::::::::::::::ミ:ヘ
       |:|  ---    ----  |:|
       `=-{´●}--{＜'}='
        `i      ＞      リ
         ＼  `----'  /
          `'-===--'''
    ／.:.∧ ▼∧ .::.:＼</meta>
```
His approval rating will rise even more.

No.0002
<meta type="person" name="Daniel" >

```
      xミミミミ`丶ミミミ
     /ミミミミミ伐:ミ ミミヘ
     || --    ／／／  ||
      `"=·-  -·=  "リ}      <Second monetary policy!
      `i  (   )    リ
       ＼ ----· |
        `'-===--'''
    ／.:    Y    .::.:＼  </meta>
```
another hope for us No.0003
What will they actually do ?

ANALYZING A DOCUMENT THAT INCLUDES A TEXT-BASED VISUAL REPRESENTATION

BACKGROUND

The present invention relates to an apparatus, a method, and a program for analyzing a document including a text-based visual representation such as so-called ASCII art.

Large amounts of data are analyzed to extract various pieces of useful information. One technique of this type is to analyze an electronic document (text data) in order to evaluate topics or matters of concern. In general, natural language processing such as morphological analysis or syntax analysis is performed to analyze a document.

On the other hand, a text-based visual representation called ASCII art or text art may be used, in addition to normal text, in an electronic document acquired from the Internet or the like. In such a visual representation, information is represented by the appearance of arrays of characters or symbols, and the used characters or symbols themselves have little meaning on the visual representation. Therefore, appropriate information may not be able to be extracted depending on the processing for general document analysis. Consequently, a part of the text-based visual representation has been conventionally separated from the electronic document to perform natural language processing on the parts (text) except the visual representation in order to analyze the content.

Information has also been extracted from the part of the text-based visual representation in the electronic document. For example, there is a conventional technique for preparing a dictionary in which a character/symbol string listed in advance as a visual representation is associated with the content (meaning) represented by the visual representation to extract information from the part of the visual representation.

SUMMARY

In one embodiment of the present invention, a hardware device analyzes a document that includes a text-based visual representation. A correspondence information hardware storage device holds known representations of graphical images as text-based visual representations. The graphical images depict portraits of physical objects. The text-based visual representations are associated with information that each describe one of the physical objects. An identification hardware device identifies a text-based visual representation within a document. The identification hardware device matches the text-based visual representation within the document to one or more of the text-based visual representations stored in the correspondence information hardware storage device. An editing hardware device retrieves information from the correspondence information hardware storage device that is identified, by the identification hardware device, as describing a text-based visual representation component within the document. The editing hardware device displays the text-based visual representation component within the document and information that describes the text-based visual representation on a display.

In one embodiment of the present invention, a device modifies a document to include a text-based visual representation. The device comprises: an extraction hardware device for extracting a text part from a document; a keyword extraction hardware device for extracting a keyword from the text part; and an editing hardware device for: matching the keyword to a special character; matching the special character to a text-based visual representation in a database, wherein the text-based visual representation generates a visual image of a physical object using text characters and at least one special character; and populating the document with the text-based visual representation from the database that contains the special character that matches the keyword from the text part.

In one embodiment of the present invention, a method modifies a document to include a text-based visual representation. A text part is extracted from a document. A keyword is extracted from the text part. The keyword is matched to a special character. The special character is matched to a text-based visual representation in a database, wherein the text-based visual representation generates a visual image of a physical object using text characters and at least one special character. The document is populated with the text-based visual representation from the database that contains the special character that matches the keyword from the text part.

BRIEF DESCRIPTION OF THE SEVERAL VIEWS OF THE DRAWINGS

FIG. 3 is a diagram showing an example of the structure of an object category dictionary in the embodiment.

DETAILED DESCRIPTION

Figure 1:
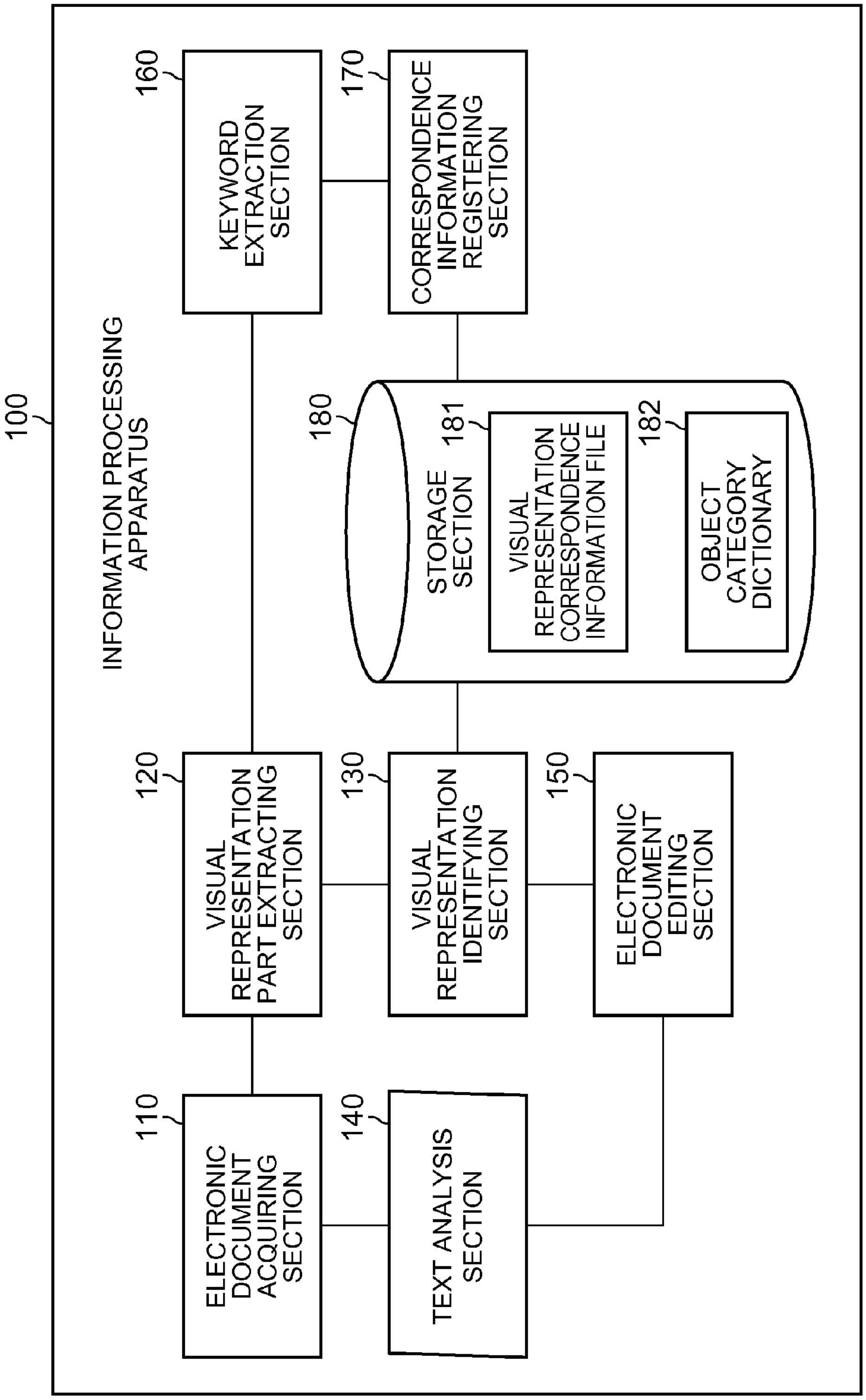
FIG. 1 is a block diagram showing an example of the functional configuration of an information processing apparatus to which an embodiment is applied.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A text-based visual representation is not a target for natural language processing such as morphological analysis. Therefore, when such a visual representation appears in an electronic document to be analyzed, there is a need to separate between text parts and visual representation parts. However, if information indicated by the visual representation can be extracted, it will be desired in analyzing the document.

However, text-based visual representations representing various contents are being created every day. Even in the case of visual representations that represent the same or similar objects, various variations are created by minute differences (for example, in the case of representations of a person's face, different expressions of faces are easily created by changing a character(s) (symbol(s)) that represent eyes or a mouth). Therefore, it is very difficult to manually create and expand a dictionary in which a meaning is uniformly associated with each visual representation.

The present invention has been made in view of such problems, and it is an object thereof to extract information based on a text-based visual representation accurately from a document including the visual representation.

An embodiment of the present invention will be described in detail below with reference to the accompanying drawings.

With reference now to FIG. 1, a block diagram showing an example of the functional configuration of an information processing apparatus to which the embodiment is applied is presented. An information processing apparatus 100 to which the embodiment is applied is an apparatus for analyzing an electronic document, which is implemented by using a personal computer or the like. As shown in FIG. 1, the information processing apparatus 100 of the embodiment includes an electronic document acquiring section 110, a visual representation part extracting section 120, a visual representation identifying section 130, a text analysis section 140, an electronic document editing section 150, a keyword extraction section 160, a correspondence information registering section 170, and a storage section 180. The storage section 180 is implemented by storage means, such as a memory or a magnetic disk drive, for storing a visual representation correspondence information file 181 and an object category dictionary 182.

The electronic document acquiring section 110 acquires an electronic document to be analyzed. The method of acquiring the electronic document is not particularly limited. For example, the electronic document to be analyzed can be acquired by receiving it from a server or the like provided on a network such as the Internet, or by reading it from an external storage device.

The visual representation part extracting section 120 extracts a part where a text-based visual representation may be contained in the electronic document acquired by the electronic document acquiring section 110. Most of characters or symbols that make up a visual representation are used depending on the appearance (shape) thereof irrespective of the meaning thereof. Therefore, the appearance ratio of a so-called special character such as a symbol is generally high compared to normal text. Therefore, the proportion of a normal character to the special character is checked line by line in the electronic document, and when the special character is contained at a rate greater than or equal to a preset threshold value, a corresponding line is determined and extracted to have the potential to make up a visual representation.

Further, there is a case where the visual representation is made up over two or more lines of the electronic document. When there are consecutive lines having the special character whose rate is greater than or equal to the threshold value, all of these lines are determined and extracted to be a part (area) where the visual representation may be contained. Note that the area unit for which the proportion of the special character is checked is not limited to that mentioned above. The proportion of the special character may be checked in units of areas based on a predetermined given criterion (e.g., paragraph). Further, there are various conventional methods as the method of extracting a text-based visual representation part from the electronic document, and any one of the existing methods can be applied to the visual representation part extracting section 120 of the embodiment.

The visual representation identifying section 130 specifies a visual representation part in the text part extracted by the visual representation part extracting section 120 to identify an object indicated by the visual representation. Specifically, the visual representation identifying section 130 compares a visual representation (hereinafter called a known representation) preregistered in the visual representation correspondence information file 181 of the storage section 180 with the text part extracted from the electronic document to determine whether a visual representation representing the same object as that of the known representation is included in this text part. The visual representation correspondence information file 181 will be described later.

Here, the determination of whether the visual representation included in the text part extracted from the electronic document (hereinafter referred to as the extracted visual representation) represents the same object as that of the known representation is made based on the similarity between the visual representations. As a specific method, for example, edit distance (Levenshtein Distance) can be used. In other words, when the edit distance between the extracted visual representation and the known representation is less than or equal to a predetermined threshold value, the visual representation identifying section 130 determines that both are similar and the extracted visual representation and the known representation represent the same object.

In addition to this, as the method of determining the similarity between visual representations, it is considered a method using the number of common parts in character strings that make up both. For example, when a person's face is represented, the same characters or symbols are used for facial parts (regions) such as the hairstyle, eyes, nose, and mouth that characterize the face, and a part of the facial parts is often changed to represent a change in facial expression. Therefore, when there are many common character string parts between two visual representations, it can be determined that the degree of similarity between both is high. Further, it is considered that visual representations to be compared are converted to images, respectively, to determine the similarity between the images using an existing method of determining the degree of similarity between images. Various existing methods can be used as the method of determining the degree of similarity between images. For example, if visual representations represent the faces or busts of persons, it can be considered a method of comparing the feature quantities used in facial image recognition. Note that the method of determining the similarity between visual representations, which is applicable to the embodiment, is not limited to the above-mentioned method, and any of various existing methods can be applied.

Thus, when determining that the visual representation extracted from the electronic document is similar to any one of known representations registered in the visual representation correspondence information file 181, the visual representation identifying section 130 recognizes the extracted visual representation as one of visual representations that represent the same object as that represented by the corresponding known representation.

The text analysis section 140 performs text analysis using natural language processing, such as morphological analysis, on parts other than the text part extracted by the visual representation part extracting section 120 from the electronic document to be processed. In the embodiment, an existing technique for common natural language processing can be used for the text analysis processing.

The electronic document editing section 150 edits the electronic document to be processed to give meta-information. Specifically, the electronic document editing section 150 adds information on an object represented by the extracted visual representation recognized by the visual representation identifying section 130 and the results of analysis by the text analysis section 140 to the electronic document as meta-information. The meta-information can be added by any of various data systems. For example, "META tag" in HTML text or the like may be used.

The keyword extraction section 160 extracts, from the electronic document, a keyword on the visual representation of the text part extracted by the visual representation part extracting section 120. Specifically, in the electronic document to be processed, text included in an area of a specific range based on the text part extracted by the visual representation part extracting section 120 is targeted to determine whether a phrase registered in the object category dictionary 182 of the storage section 180 exists in the text. The object category dictionary 182 will be described later.

Here, the range of the area in the electronic document (extraction target area) to be extracted by the keyword extraction section 160 is preset according to the type of electronic document or the like. For example, it is considered that a range of several lines before and after the text part extracted by the visual representation part extracting section 120 are set as the extraction target area. Further, on a web page of a so-called bulletin board (Bulletin Board System), contents having much to do with the visual representation are often stated in the entry of the text-based visual representation or entries before and after the visual representation. Therefore, it is considered that the entry of the text-based visual representation is set as the extraction target area or entries before and after the entry in a certain range are set as the extraction target area.

The correspondence information registering section 170 registers, in the visual representation correspondence information file 181, the text part extracted by the visual representation part extracting section 120 and the keyword extracted by the keyword extraction section 160 in association with each other. Thus, the visual representation extracted from the electronic document is additionally registered in the visual representation correspondence information file 181 as a new known representation. Here, when the visual representation extracted from the electronic document by the visual representation identifying section 130 is determined not to be similar to any of known representations registered in the visual representation correspondence information file 181, it can be configured such that the keyword extraction by the keyword extraction section 160 and the registration by the correspondence information registering section 170 can be performed on the extracted visual representation.

As the processing performed when the visual representation extracted from the electronic document is determined not to be similar to any of known representations registered in the visual representation correspondence information file 181, it is considered that the electronic document is edited based on the text part extracted by the visual representation part extracting section 120. In this case, the electronic document editing section 150 adds the keyword extracted by the keyword extraction section 160 as meta-information instead of information on an object represented by the visual representation identified by the visual representation identifying section 130 to the text part extracted by the visual representation part extracting section 120 in the electronic document to be processed.

The storage section 180 stores the visual representation correspondence information file 181 in which each visual representation and an object represented by the visual representation are registered in association with each other, and the object category dictionary 182 for holding each keyword used to identify an object and classified by object category. In other words, the storage section 180 functions as a visual representation correspondence information storing section and an object category dictionary storing section.

Figure 2:
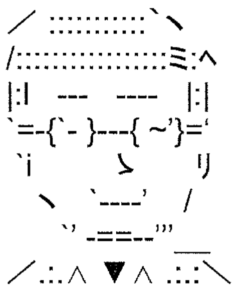
FIG. 2 is a diagram showing an example of the structure of a visual representation correspondence information file in the embodiment.
Figure 2:

FIG. 2 is a diagram showing an example of the structure of the visual representation correspondence information file 181. The visual representation correspondence information file 181 shown in FIG. 2 is made up as a table in which arrays of text as a visual representation and an object represented by the visual representation (a person in the example shown) are registered in association with each other. For example, the name of an object (person) as John and a visual representation representing this object are registered on line "No. 1" in the visual representation correspondence information file 181 shown. Further, the name of an object (person) as "Daniel" and a visual representation representing this object are registered on line "No. 2". As object information, additional information for characterizing a visual representation may be registered together with the name. For example, when a visual representation represents a person as shown in FIG. 2, additional information indicating emotion or facial expression such as "laughing" or "angry" can be registered. In this case, "laughing John" and "angry John" may also be registered as separate visual representations.

In general, the object represented by each text-based visual representation is not limited to a specific person alone. There exist many visual representations representing abstract characters or things other than persons. Therefore, in the visual representation correspondence information file 181 of the embodiment, such various objects in addition to the persons shown in FIG. 2 are associated with visual representations. The visual representation correspondence information file 181 may also be prepared and held for each object category (person, animal, vehicle, etc.) individually.

FIG. 3 is a diagram showing an example of the structure of the object category dictionary 182. The object category dictionary 182 shown in FIG. 3 is an example of a personal name dictionary used to register a visual representation representing a person in the visual representation correspondence information file 181. A dictionary with each keyword such as a name registered for each category to be registered is stored in the storage section 180.

Edit Processing for Electronic Document

Figure 4:
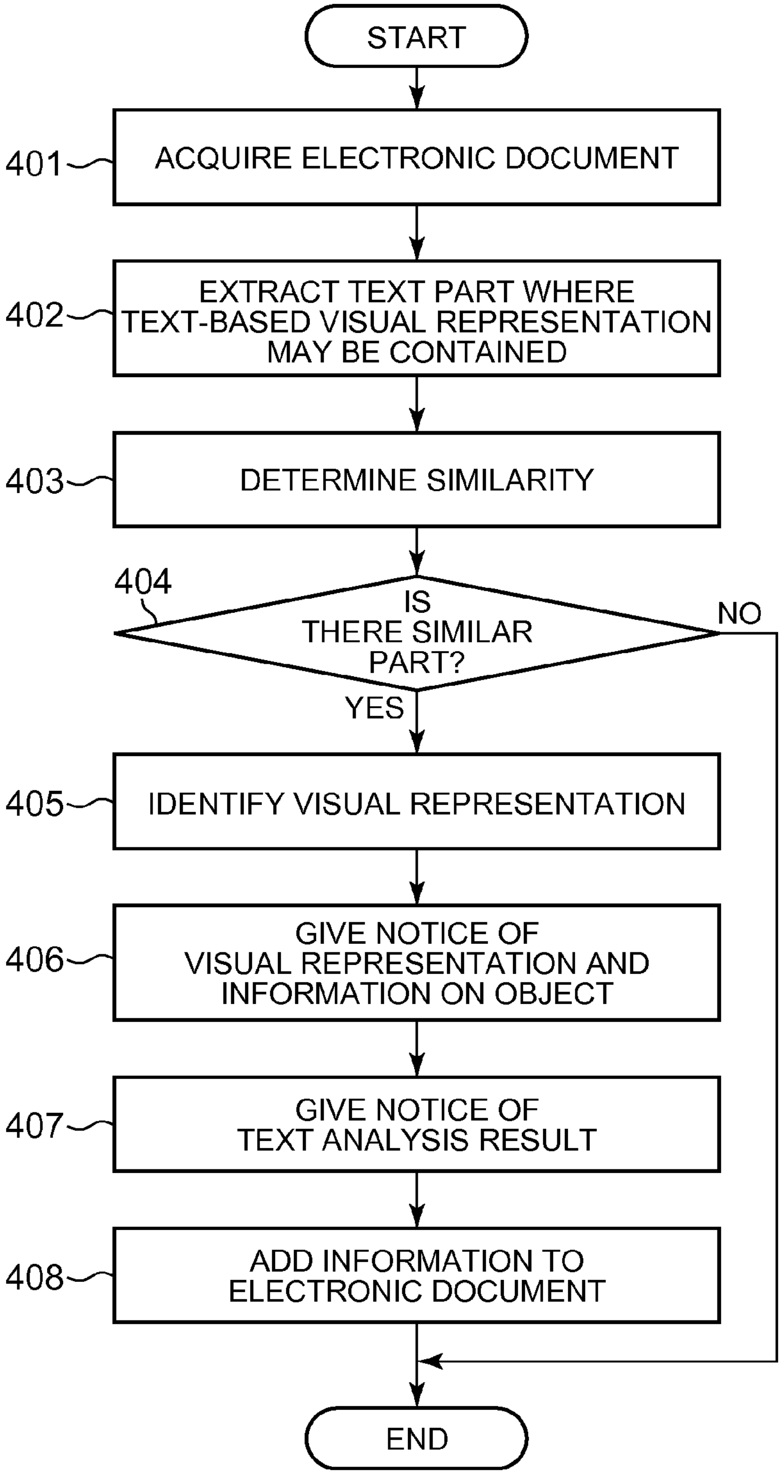
FIG. 4 is a flowchart showing edit processing for an electronic document according to the embodiment.

FIG. 4 is a flowchart showing edit processing for an electronic document according to the embodiment. As shown in FIG. 4, the electronic document acquiring section 110 in the information processing apparatus 100 of the embodiment first acquires an electronic document to be processed (step 401). Then, the visual representation part extracting section 120 extracts, from the acquired electronic document, a text part where a text-based visual representation may be contained (step 402). Next, the visual representation identifying section 130 determines whether a part similar to a known representation held in the visual representation correspondence information file 181 is included in the text part extracted by the visual representation part extracting section 120 (step 403).

When it is determined that there is a similar part (Yes in step 404), the visual representation identifying section 130 next identifies the part as a visual representation representing the same object as an object represented by the known representation based on the part determined to be similar and the known representation (step 405). Then, the visual representation identifying section 130 acquires information on the object represented by the corresponding known representation from the visual representation correspondence information file 181, and notifies the electronic document editing section 150 of the object information together with information on the identified visual representation (step 406).

Next, the text analysis section 140 performs text analysis on the electronic document acquired in step 401, and notifies the electronic document editing section 150 of the analysis results (step 407). Note that processing by the text analysis section 140 has only to be performed before processing by the electronic document editing section 150 to be described later is performed after the electronic document to be processed is acquired in step 401, i.e., the processing may be performed prior to processing by the visual representation part extracting section 120 and the visual representation identifying section 130, or in parallel with these kinds of processing.

Based on the information notified from the visual representation identifying section 130, the electronic document editing section 150 specifies the visual representation identified in the electronic document to be processed, and adds information on the object represented by the visual representation in association with the specified visual representation (step 408). When it is determined in step 404 that there is no similar part (No in step 404), only information obtained by the processing performed by the text analysis section 140 is added to the electronic document without performing processing by the visual representation part extracting section 120 and the visual representation identifying section 130 (step 405, step 406).

Figure 5:
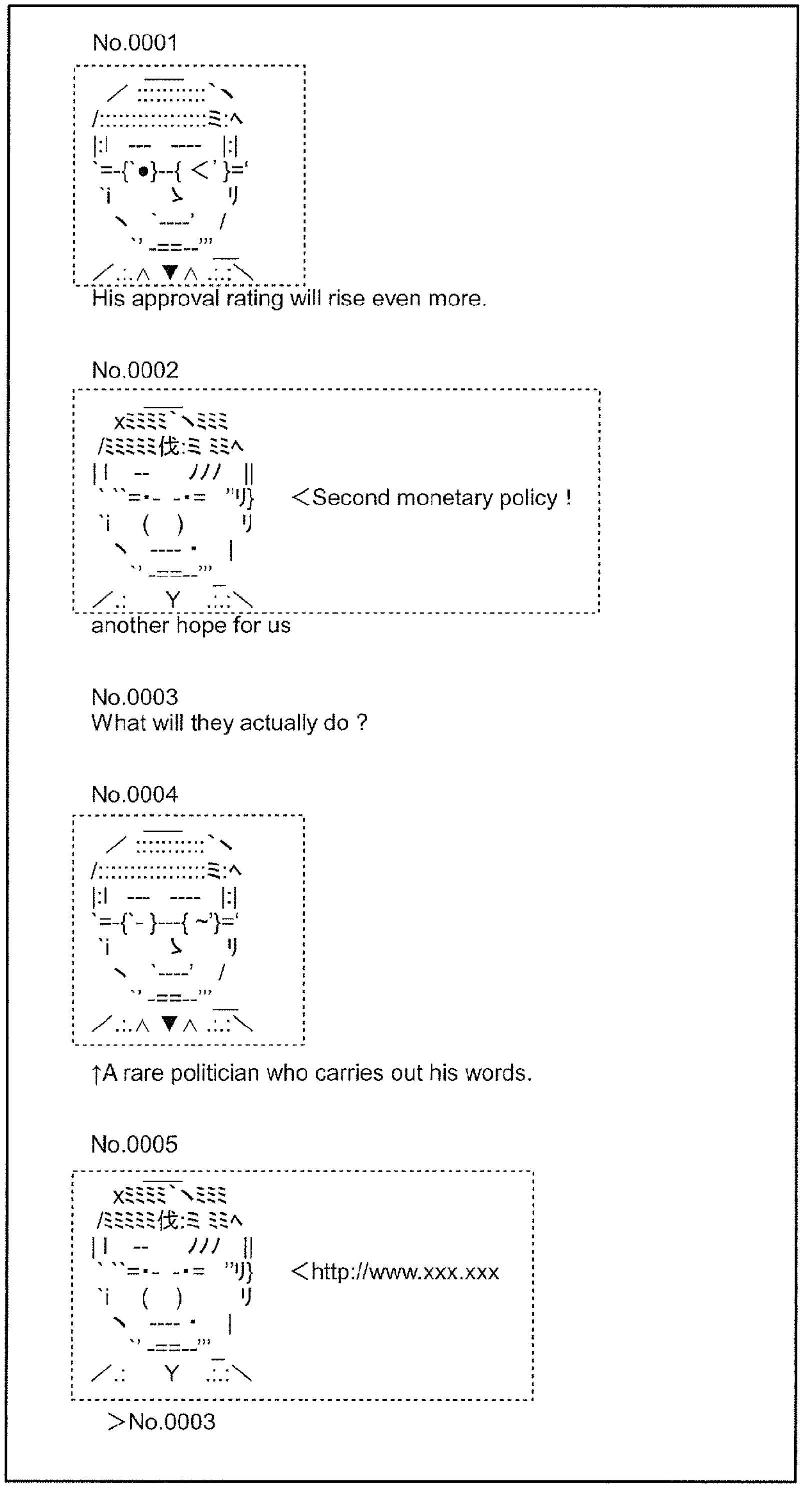
FIG. 5 is a diagram showing an example of an electronic document to be processed.

FIG. 5 shows an example of an electronic document to be processed. The electronic document shown in FIG. 5 is an example of text data in an electronic bulletin board system. When this electronic document is acquired by the electronic document acquiring section 110 as a processing target, text parts where text-based visual representations may be contained are extracted by the visual representation part extracting section 120. In the example shown, it is assumed that parts surrounded by the broken lines in entries "No. 0001", "No. 0002", "No. 0004", and "No. 0005" are so determined that text-based visual representations may be contained therein.

Figure 6:
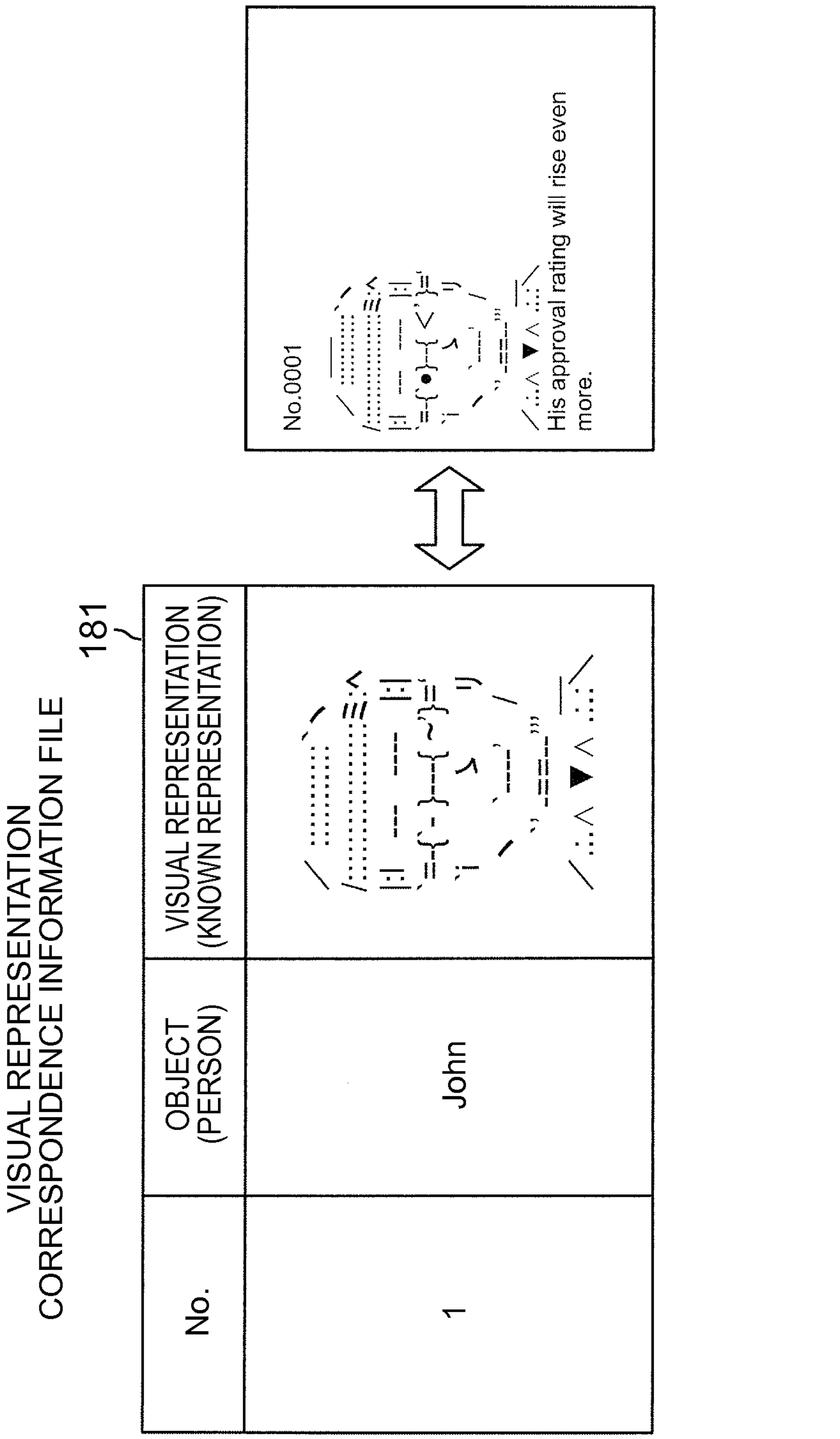
FIG. 6 is a diagram showing an example of comparing a known representation registered in the visual representation correspondence information file with a part extracted from the electronic document.

Next, the parts extracted as mentioned above are identified by the visual representation identifying section 130. First, the extracted part in entry "No. 0001" is considered. FIG. 6 is a diagram for comparing a known representation registered in "No. 1" of the visual representation correspondence information file 181 shown in FIG. 2 with the extracted part of entry "No. 0001". Referring to FIG. 6, the latter is different from the former in that characters that make up a part of the face (the part of eyes) are replaced by other characters. Here, it is assumed that, since the replacement of characters is made only in a range of small parts, the edit distance between both is smaller than a preset threshold value. Therefore, the visual representation identifying section 130 determines that the extracted part in entry "No. 0001" of the electronic document is a visual representation representing the same object as that of the known representation in "No. 1" of the visual representation correspondence information file 181.

Figure 7:
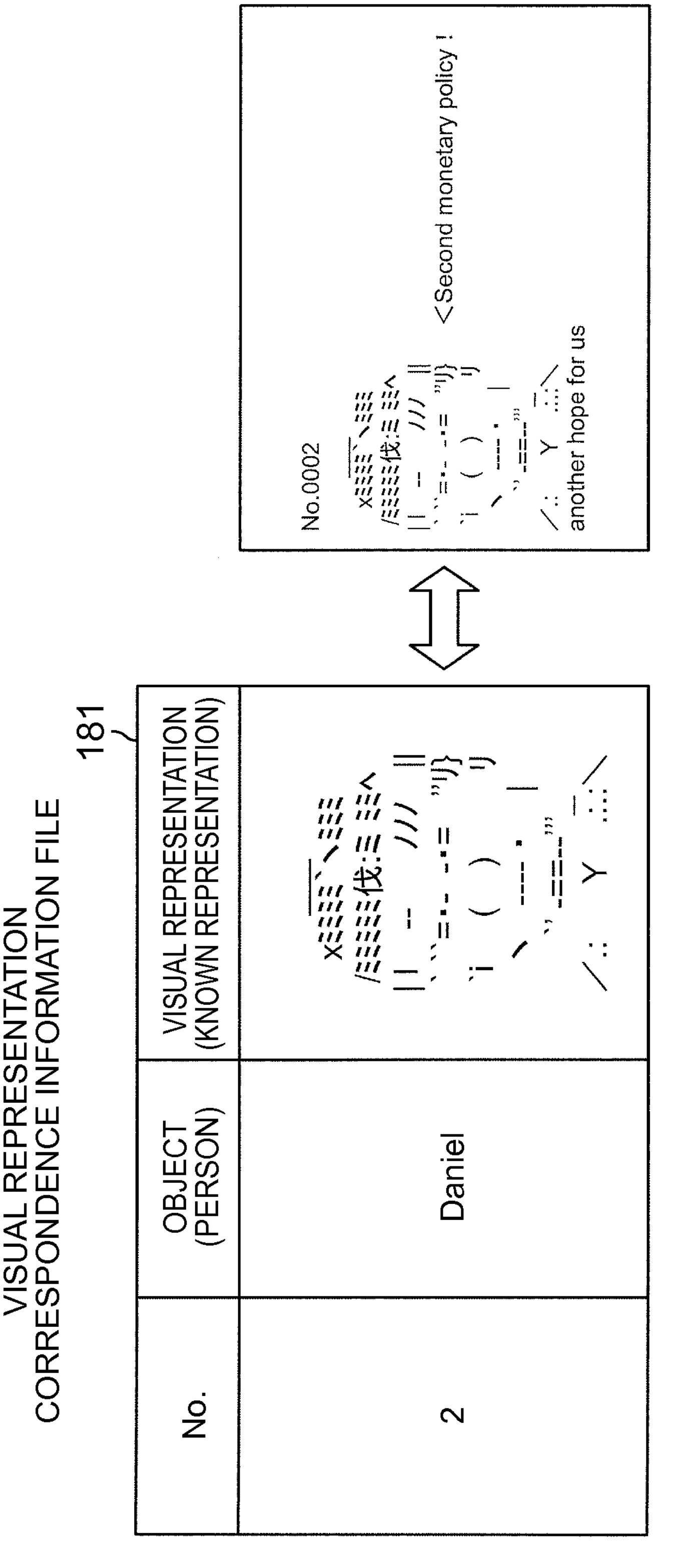
FIG. 7 is a diagram showing another example of comparing a known representation registered in the visual representation correspondence information file with a part extracted from the electronic document.

Further, the extracted part in entry "No. 0002" is considered. FIG. 7 is a diagram for comparing a known representation registered in "No. 2" of the visual representation correspondence information file 181 shown in FIG. 2 with the extracted part of entry "No. 0002". Referring to FIG. 7, the latter is different from the former in that a character string indicative of a statement of the person represented by the visual representation and placed on the side of the face is added. Here, it is assumed that, since both differs only in that an additional character string is added close to the visual representation, the edit distance between both is smaller than a preset threshold value. Therefore, the visual representation identifying section 130 determines that the extracted part in entry "No. 0002" of the electronic document is a visual representation representing the same object as that of the known representation in "No. 2" of the visual representation correspondence information file 181. The extracted parts in entries "No. 0004" and "No. 0005" are also processed in the same manner to identify visual representations.

Figure 8:
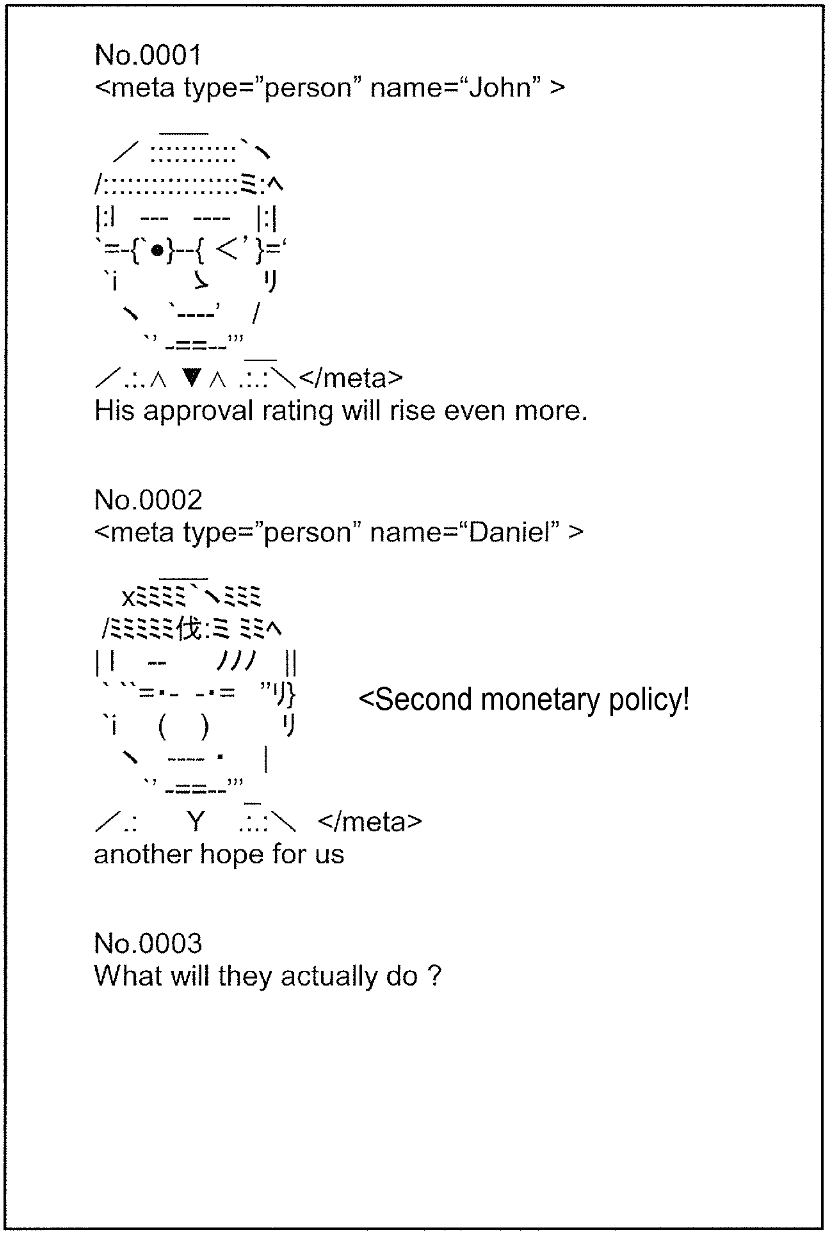
FIG. 8 is a diagram showing a state of adding meta-information to the electronic document.

Next, to the part of each visual representation identified as mentioned above, information on an object represented by the visual representation is added by the electronic document editing section 150 as meta-information. FIG. 8 is a diagram showing a state of adding meta-information to the parts of entries "No. 0001" and "No. 0002" in the electronic document shown in FIG. 5. In the example shown, "META tag" is used to add object information ("type" and "name") represented by the visual representations. Specifically, "<meta type="person" name="John">" is added to entry "No. 0001", and "<meta type="person" name="Daniel">" is added to entry "No. 0002".

Registration Processing for Visual Representation

Figure 9:
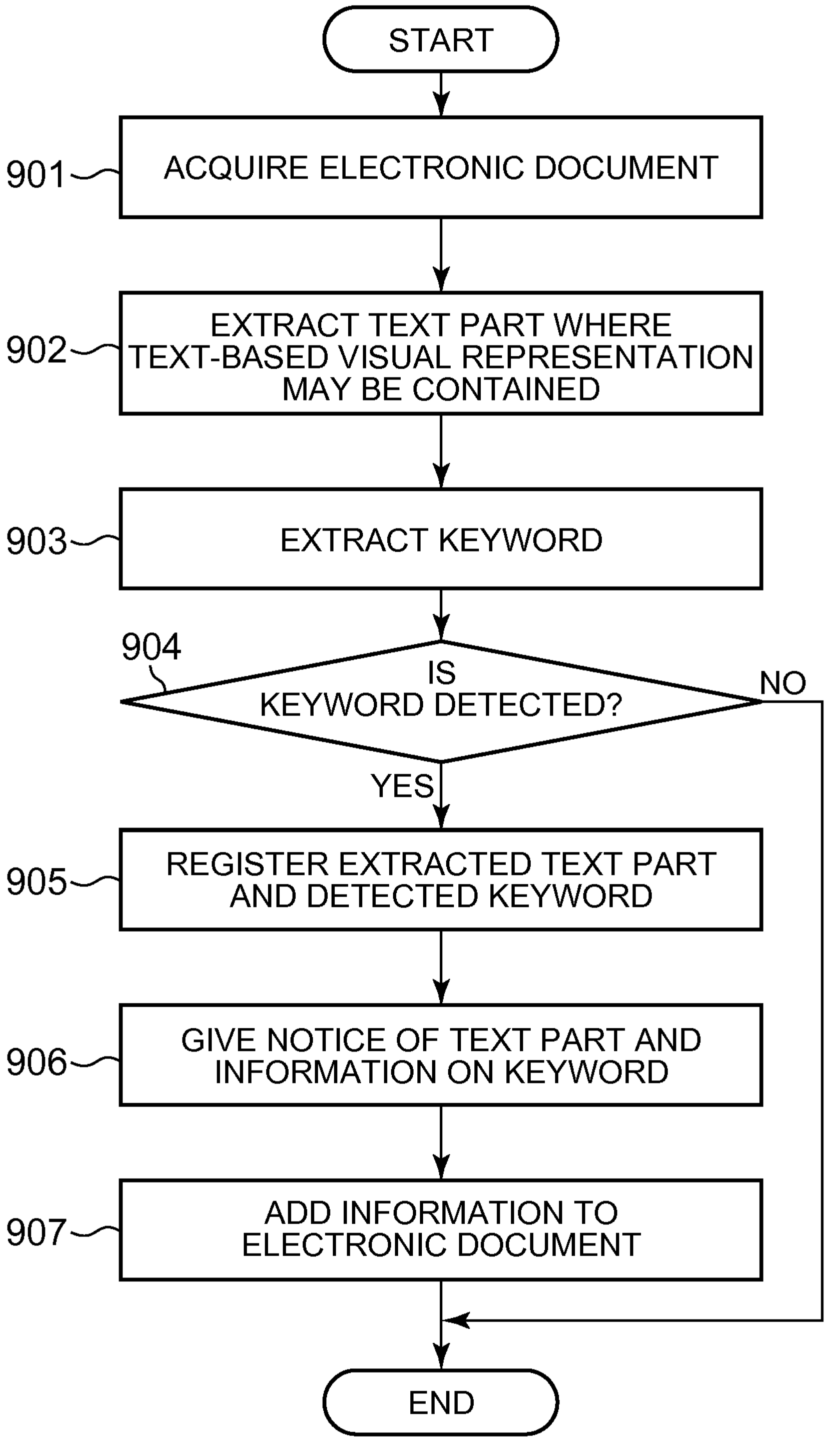
FIG. 9 is a flowchart showing processing for registering information on a visual representation in the visual representation correspondence information file based on information acquired from the electronic document.

FIG. 9 is a flowchart showing processing for registering information on a visual representation in the visual representation correspondence information file 181 based on information acquired from the electronic document. In the processing shown in FIG. 9, operations in step 901 and step 902 are the same as those in step 401 and step 402 shown in FIG. 4. In other words, text parts where text-based visual representations may be contained are extracted from the electronic document acquired as a processing target.

Next, the keyword extraction section 160 extracts a keyword in an area identified based on each text part extracted in step 902 (step 903). When a keyword is detected (Yes in step 904), the correspondence information registering section 170 registers, in the visual representation correspondence information file 181, the text part extracted in step 902 in association with the keyword detected in step 903 (step 905).

The correspondence information registering section 170 notifies the electronic document editing section 150 of information on the text part and the keyword (step 906). Then, based on the information notified from the correspondence information registering section 170, the electronic document editing section 150 identifies the extracted text part in the electronic document to be processed, and adds the detected keyword in association with the identified text part (step 907). When no keyword is detected in step 904 (No in step 904), the registration processing by the correspondence information registering section 170 and the processing by the electronic document editing section 150 are not performed (steps 905 to 907).

As mentioned above, the operations in step 901 and step 902 are the same as those in step 401 and step 402 shown in FIG. 4. Therefore, for example, when the visual representation identifying section 130 determines in step 404 of FIG. 4 that there is no part similar to any known representation, processing in step 903 and beyond can be performed as subsequent processing. Further, the processing for editing the electronic document based on the extracted text part and the detected keyword (steps 906 and 907) is not indispensable, and only the registration to the visual representation correspondence information file 181 may be performed.

Further, when a specific keyword is obtained based on two or more text parts, a visual representation in the two or more text parts and the keyword stated in the two or more text parts may be registered in the visual representation correspondence information file 181 to improve the accuracy of association between the visual representation and the keyword based on the extracted text part. In this case, extracted text parts are compared to determine whether they are similar. The determination of the similarity can be made in the same manner as the case where the visual representation identifying section 130 determines the similarity between the part extracted from the electronic document and the known representation.

Figure 10:
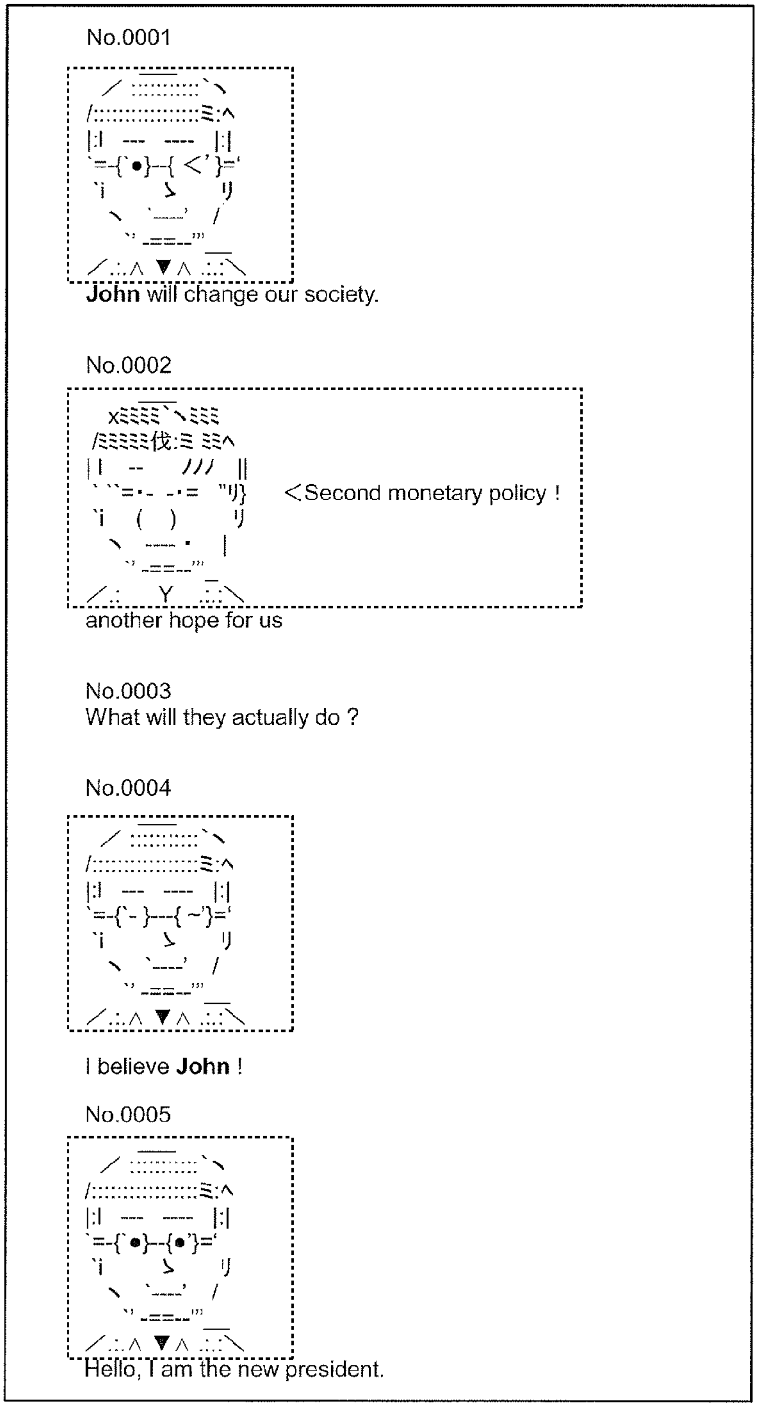
FIG. 10 is a diagram showing another example of the electronic document to be processed.

FIG. 10 shows an example of another example of the electronic document to be processed. The electronic document shown in FIG. 10 is an example of text data in an electronic bulletin board system. In the example shown, it is assumed that parts surrounded by the broken lines in entries "No. 0001", "No. 0002", "No. 0004", and "No. 0005" are so determined that text-based visual representations may be contained therein. Here, as mentioned above, a description will be made by taking, as an example, a case where a keyword obtained from two or more text parts is registered in the visual representation correspondence information file 181 to improve accuracy.

In the example shown in FIG. 10, it is assumed that respective extracted parts of entries "No. 0001", "No. 0004", and "No. 0005" are identified as being similar to each other. In other words, since these extracted parts differ only in characters that make up a portion corresponding to a part of their faces (the part of eyes), the differences also becomes small, for example, in the above-mentioned determination of similarity using edit distance made by the visual representation identifying section 130. Therefore, the keyword extraction section 160 sets a extraction area, based on each of these extracted parts determined to be similar, to be within the entry including each extracted part to extract a keyword (here, personal name) from text within these entries.

In the example shown in FIG. 10, a keyword "John" is detected from text stating "John will change our society" in entry "No. 0001". The keyword "John" is also detected from text stating "I believe John!" in entry "No. 0004". Further, no keyword (personal name) is detected from text stating "Hello, I am the new president" in entry "No. 0005". Here, since the same keyword "John" is detected from two of the three extracted parts similar to each other, the correspondence information registering section 170 determines that these three extracted parts are visual representations representing the same object and registers, in the visual representation correspondence information file 181, "John" as an object represented by each visual representation.

As described with reference to FIG. 9, when editing is performed to add, to the electronic document, information identified as an object represented by a visual representation, the electronic document editing section 150 adds, as meta-information, information on the identified object, "John", to each of the extracted parts in entries "No. 0001", "No. 0004", and "No. 0005" determined to be similar to each other in the electronic document to be processed.

Hardware Configuration Example

Figure 11:
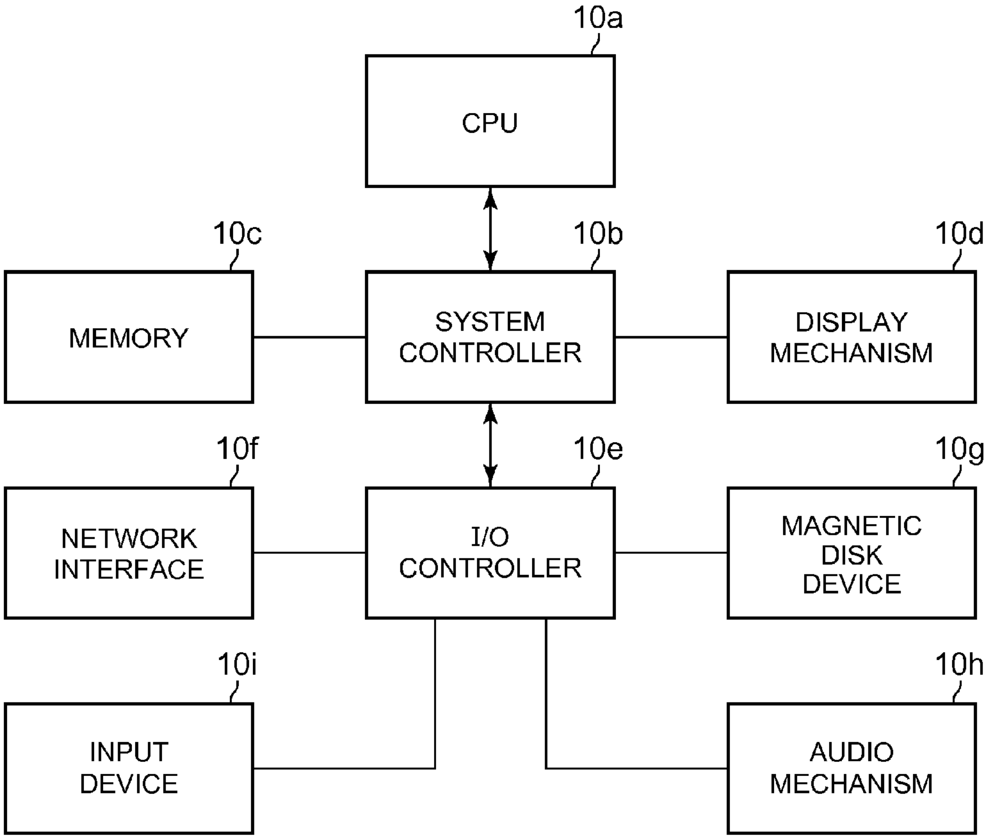
FIG. 11 is a block diagram showing a hardware configuration example preferred to configure the information processing apparatus of the embodiment.

FIG. 11 is a block diagram showing a hardware configuration example preferred to configure the information processing apparatus 100 of the embodiment. Here, a case where the hardware configuration is applied to a computer will be described. The computer shown in FIG. 11 includes a CPU (Central Processing Unit) 10*a* as computing means and a memory 10*c* as main storage means. The computer further includes, as external devices, a magnetic disk drive (HDD: Hard Disk Drive) 10*g*, a network interface 10*f*, a display mechanism 10*d* including a display device, an audio mechanism 10*h*, and an input device 10*i* such as a keyboard and a mouse.

In the configuration example shown in FIG. 11, the memory 10*c* and the display mechanism 10*d* are connected to the CPU 10*a* through a system controller 10*b*. The network interface 10*f*, the magnetic disk drive 10*g*, the audio mechanism 10*h*, and the input device 10*i* are connected to the system controller 10*b* through an I/O controller 10*e*. The respective components are connected by various buses such as a system bus and an I/O bus.

Note that FIG. 11 is just an illustrative example of the hardware configuration of the computer preferred to apply the embodiment. The embodiment can be applied widely to information processing apparatuses capable of displaying an electronic document to make the electronic document browsable and capable of extracting sentences based on a extraction key. Note that the embodiment is not implemented only in the configuration shown.

In FIG. 11, an OS program and application programs are stored in the magnetic disk drive 10*g*. Then, these programs are read into the memory 10*c* and executed by the CPU 10*a* to implement each function of the electronic document acquiring section 110, the visual representation part extracting section 120, the visual representation identifying section 130, the text analysis section 140, the electronic document editing section 150, the keyword extraction section 160, and the correspondence information registering section 170 in the embodiment. The storage section 180 is implemented by storage means such as the memory 10*c* and the magnetic disk drive 10*g*.

While the embodiment of the present invention has been described, the specific configuration of the present invention is not limited to the aforementioned embodiment. For example, in the configuration of the aforementioned embodiment, the visual representation part extracting section 120 is not necessarily an essential component to identify a part similar to a known representation from an electronic document to be processed. If the processing by the visual representation identifying section 130 is performed at a sufficiently high speed, a part similar to a known representation can be identified directly from the electronic document to be processed without performing the processing by the visual representation part extracting section 120 to narrow down the parts where a visual representation may be contained. Further, forms to which various changes or improvements are added are also included in the technical scope of the present invention.

As described herein and in accordance with one or more embodiments of the present invention, the present invention is carried out as an apparatus for analyzing a document including a text-based visual representation, including: a correspondence information storing section for holding known representations as text-based visual representations identified in advance and information on objects represented by the respective known representations in association with each other; an identification section for identifying a text-based visual representation part in a document to be processed as representing the same object as the known representation held in the correspondence information storing section; and an editing section for adding information on an object determined to be represented by a visual representation to the part identified by the identification section as this visual representation in the document to be processed.

As described herein and in accordance with one or more embodiments of the present invention, the identification section determines whether a text part similar to any one of the known representations held in the correspondence information storing section is included in the document to be processed, and identifies a text part determined to be similar to any one of the known representations as a visual representation representing the same object as that of the known representation. More specifically, when an edit distance between a text part as a part of the document to be processed and any one of the known representations held in the correspondence information storing section is smaller than a predetermined threshold value, the identification section determines that this text part is similar to the known representation.

As described herein and in accordance with one or more embodiments of the present invention, it is preferred that the apparatus further includes an extraction section for extracting a text part, where a text-based visual representation may be contained, based on the proportion of a special character in an area identified based on a predetermined criterion in the document to be processed, wherein the identification section targets the text part extracted by the extraction section to identify the visual representation. The apparatus may further include a keyword extraction section for extracting a keyword based on a predetermined criterion from text included in an area identified based on the text part extracted by the extraction section in the document to be processed, and a registration section for holding, in the correspondence information storing section, the text part as a text-based visual representation and the detected keyword as information on an object represented by the visual representation. It is further preferred that the editing section adds the keyword detected by the keyword extraction section as information on an object represented by the visual representation identified by the text part to the text part extracted by the extraction section in the document to be processed.

As described herein and in accordance with one or more embodiments of the present invention, the present invention is carried out as a method of analyzing a document including a text-based visual representation by a computer, including the steps of: determining whether there is a text part similar to any one of known representations as text-based visual representations identified in advance in a document to be processed and held in predetermined storage means; when there is a text part determined to be similar to any one of the known representations, identifying the text part as a visual representation representing the same object as that of the known representation; and adding information on an object determined to be represented by a visual representation to the text part identified as this visual representation.

As described herein in one or more embodiments, an apparatus for analyzing a document includes a text-based visual representation includes: a visual representation correspondence information file 181 for holding known representations as text-based visual representations identified in advance and information on objects represented by the respective known representations in association with each other; a visual representation identifying section 130 for identifying a text-based visual representation part in a document to be processed as representing the same object as that of the known representation held in the visual representation correspondence information file 181; and an electronic document editing section 150 for adding information on an object determined to be represented by a visual representation to the part identified by the visual representation identifying section 130 as this visual representation in the document to be processed.

As described herein and in accordance with one or more embodiments of the present invention, the present invention is carried out as a program for controlling a computer to implement each function of the above-mentioned apparatus, or a program for causing a computer to perform processing corresponding to each step mentioned above. This program can be distributed by storing it on a magnetic disk, an optical disk, a semiconductor memory, or any other recording medium, or delivered through a network.

According to one or more embodiments of the present invention, information based on a text-based visual representation can be extracted accurately from a document including the visual representation.

What is claimed is:

1. A hardware device for analyzing a document including a text-based visual representation, comprising:

a correspondence information hardware storage device, wherein the correspondence information hardware storage device holds known representations of graphical images as text-based visual representations, wherein the graphical images depict portraits of physical objects, wherein the physical objects include one or more faces, and wherein the text-based visual representations are associated with information that each describe one of the physical objects, wherein each text-based visual representation includes one or more respective arrays of characters and symbols arranged to visually depict the physical object, a respective meaning of each of the characters and symbols in the one or more arrays being unrelated to the physical object;

an identification hardware device for identifying a text-based visual representation within a document, the text-based visual representation including one or more facial expressions, wherein the identification hardware device matches the text-based visual representation within the document to one or more of the text-based visual representations stored in the correspondence information hardware storage device by determining a respective edit distance between the text-based visual representation within the document and each of the one or more text-based visual representations stored in the correspondence information hardware storage and comparing each respective edit distance to a threshold, wherein each respective edit distance is the minimum number of operations to transform the text-based visual representation within the document to the respective text-based visual representation in the correspondence information hardware storage device, and wherein a Levenshtein Distance method is used to calculate the minimum number of operations; and an editing hardware device, wherein the editing hardware device retrieves information from the correspondence information hardware storage device that is identified, by the identification hardware device, as describing a text-based visual representation component within the document, and wherein the editing hardware device adds the retrieved information to the document, and adds the retrieved information to the document as meta-information, wherein the meta-information includes an object type, a name for the physical object, an emotion, and a facial expression, and displays the text-based visual representation component within the document and information that describes the text-based visual representation on a display.

2. The hardware device according to claim 1, wherein the identification hardware device further:

determines whether a text part in the document is associated with any one of the known representations held in the correspondence information hardware storage device; and associating a text-based visual representation from the correspondence information storage device that is associated with the text part to identify a particular text-based visual representation to be presented on the display.

3. The hardware device according to claim 1, further comprising:

an extraction hardware device for extracting a text part, wherein the text part is a component of the text-based visual representation within the document, wherein the component is a particular character, wherein the extraction hardware device determines a quantity of occurrences of the particular character in the text-based visual representation within the document, and wherein, based on a predetermined character occurrence level, the identification hardware device identifies the text-based visual representation within the document based on the quantity of occurrences of the particular character in the text-based visual representation within the document.

4. The hardware device according to claim 3, further comprising:

a keyword extraction hardware device for extracting a keyword based on a predetermined criterion from text included in an area identified, based on the text part extracted from the document, by the extraction hardware device; and a registration hardware device for holding, in the correspondence information hardware storage device, the text part as a text-based visual representation and the extracted keyword as information on an object represented by the text-based visual representation within the document.

5. The hardware device according to claim 4, wherein the editing hardware device further:

adds and displays, on the display, the extracted keyword with the text-based visual representation within the document.

6. The hardware device according to claim 1, wherein the graphical image includes an ASCII representation of an image.

7. The hardware device according to claim 4, wherein the graphical image includes an area wherein the text-based visual representation is identified by determining the lines of the document that include a rate of at least one special character or symbol, the at least one special character or symbol being implemented irrespective of the textual meaning thereof, that meets a threshold value.

8. The hardware device according to claim 1, wherein the meta-information includes an HTML tag.

9. The hardware device according to claim 1, wherein the graphical image includes an ASCII representation of an image.

10. The device according to claim 9, wherein the graphical image includes an area wherein the text-based visual representation is identified by determining the lines of the document that include a rate of at least one special character or symbol, the at least one special character or symbol being implemented irrespective of the textual meaning thereof, that meets a threshold value.

11. The hardware device according to claim 1, wherein the edit distance between two facial expressions in separate text-based visual representations is calculated to determine, by comparing the edit distance to the threshold, that the same individual is depicted in the separate text-based visual representations.

12. A device for modifying a document to include a text-based visual representation, the device comprising:

an extraction hardware device for extracting a text part from a document;

a keyword extraction hardware device for extracting a keyword from the text part; and an editing hardware device for:

matching the keyword to a special character;

matching the special character to a text-based visual representation in a database, wherein the text-based visual representation generates a visual image of a physical object using one or more arrays of text characters and at least one special character arranged in positions on a display to visually depict the physical object, wherein the physical object includes one or more faces, and wherein the text-based visual representation includes one or more facial expressions;

editing the document to include, in addition to the text part, the text-based visual representation from the database that contains the special character that matches the keyword from the text part, wherein a Levenshtein Distance method is used to determine that the text-based visual representation matches the keyword; and adding, to the document, meta-information including information on the physical object and the keyword, wherein the meta-information includes an object type, a name for the physical object, an emotion, and a facial expression.

13. The hardware device according to claim 12, wherein the meta-information includes an HTML tag.

14. The device according to claim 12, wherein the text-based visual representation depicts a graphical image and includes an ASCII representation of an image.

15. The device according to claim 14, wherein the graphical image includes an area wherein the text-based visual representation is identified by determining the lines of the document that include a rate of at least one special character or symbol, the at least one special character or symbol being implemented irrespective of the textual meaning thereof, that meets a threshold value.

16. A method for modifying a document to include a text-based visual representation, the method comprising:

extracting, by one or more processors, a text part from a document;

extracting, by one or more processors, a keyword from the text part;

matching, by one or more processors, the keyword to a special character;

matching, by one or more processors, the special character to a text-based visual representation in a database, wherein the text-based visual representation generates a visual image of a physical object using one or more arrays of text characters and at least one special character arranged in positions on a display to visually depict the physical object, wherein the physical object includes one or more faces, and wherein the text-based visual representation includes one or more facial expressions;

editing, by one or more processors, the document to include, in addition to the text part, the text-based visual representation from the database that contains the special character that matches the keyword from the text part, wherein a Levenshtein Distance method is used to determine that the text-based visual representation matches the keyword; and adding, to the document, meta-information including information on the physical object and the keyword, wherein the meta-information includes an object type, a name for the physical object, an emotion, and a facial expression.

17. The method according to claim 16, wherein the meta-information includes an HTML tag.

* * * * *